June 13, 1933.                M. ROMAINE ET AL                1,914,167
                                MILLING MACHINE
                         Filed July 29, 1932    5 Sheets-Sheet 5
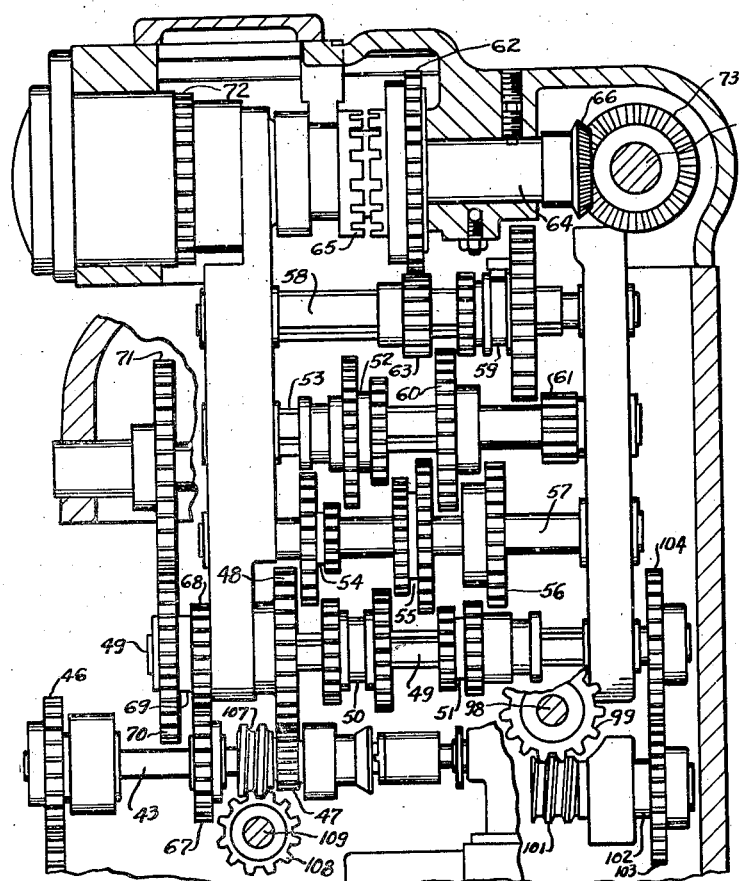
Fig.10
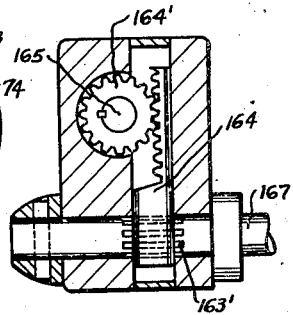
Fig.13
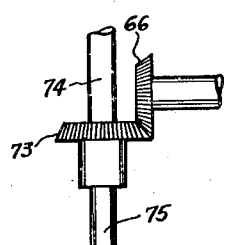
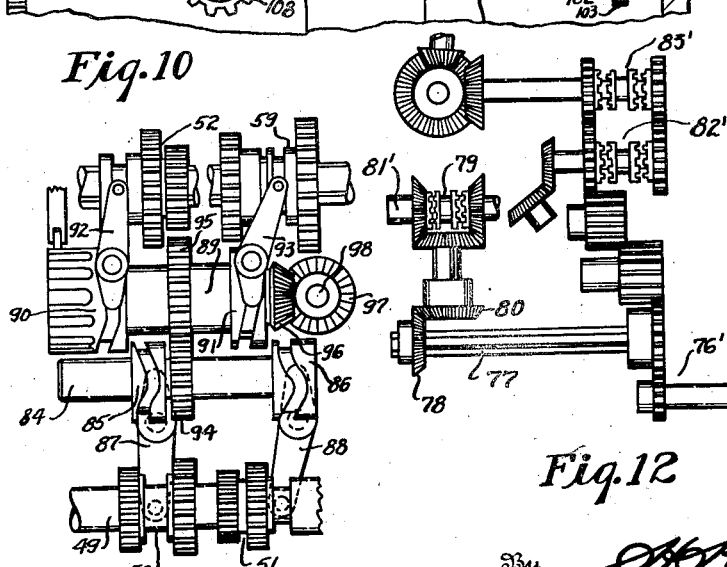
Fig.11     Fig.12
Inventor
MILLARD ROMAINE
WALTER D. ARCHEA
By HK Parsons
Attorney Patented June 13, 1933

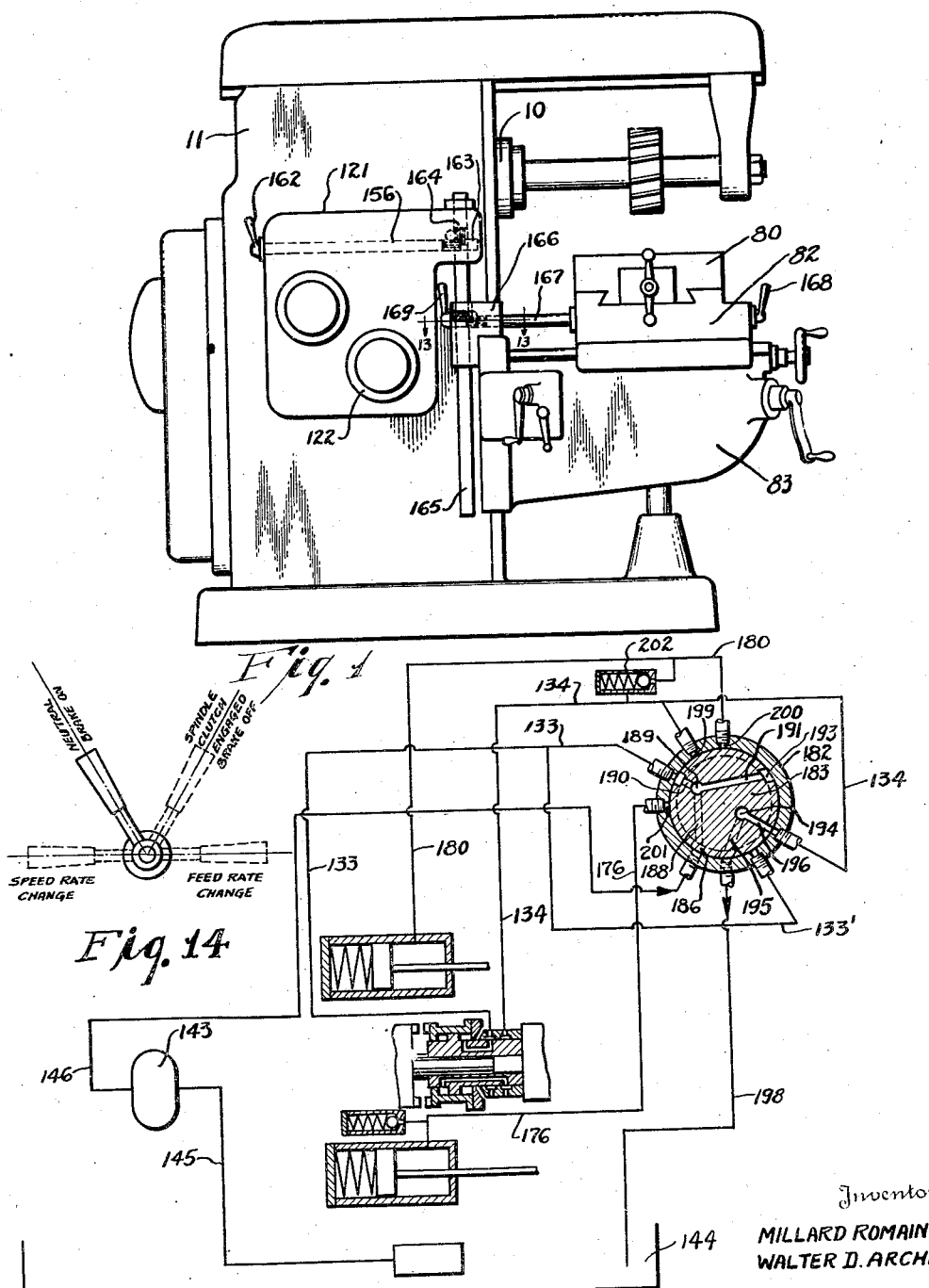

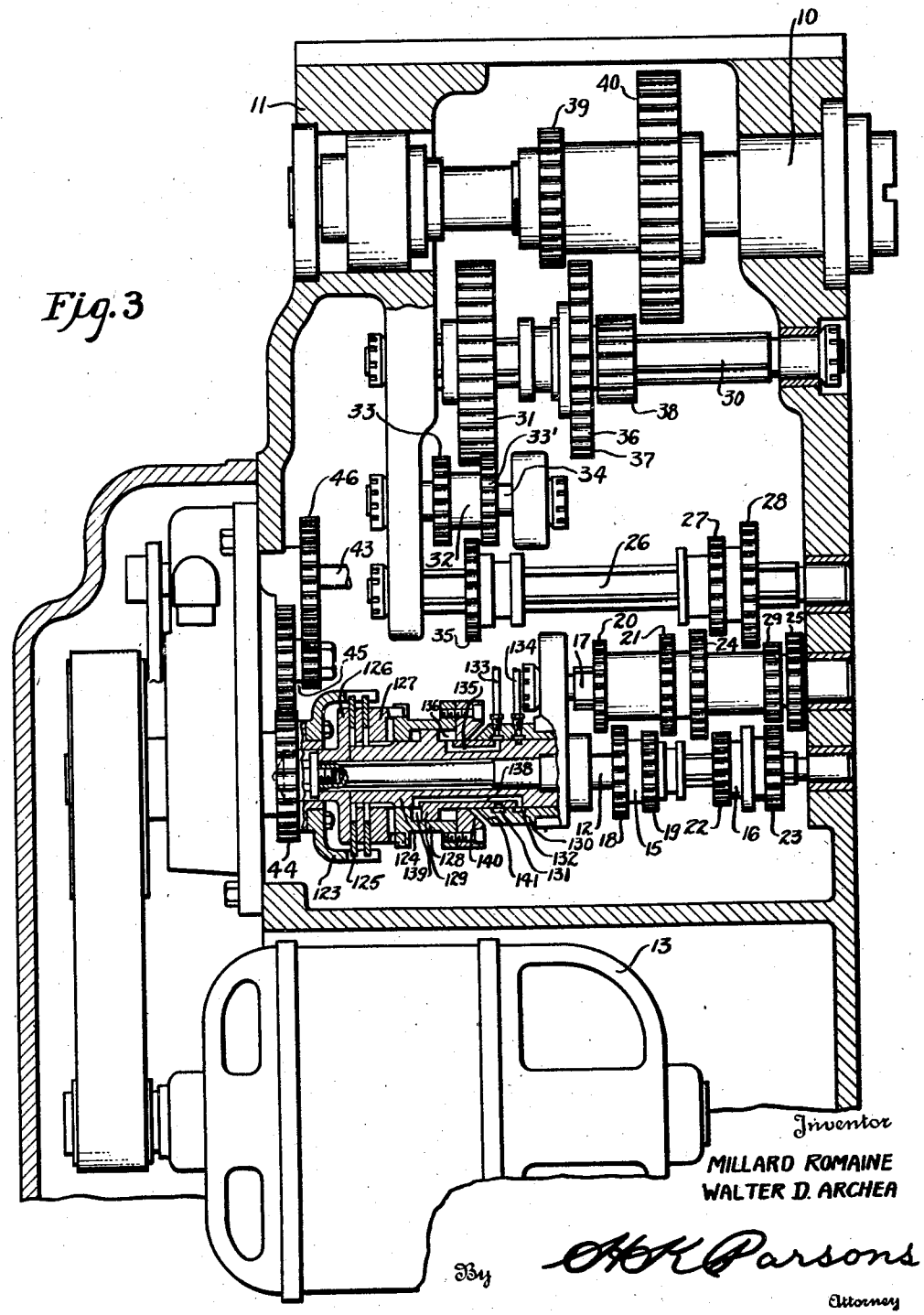

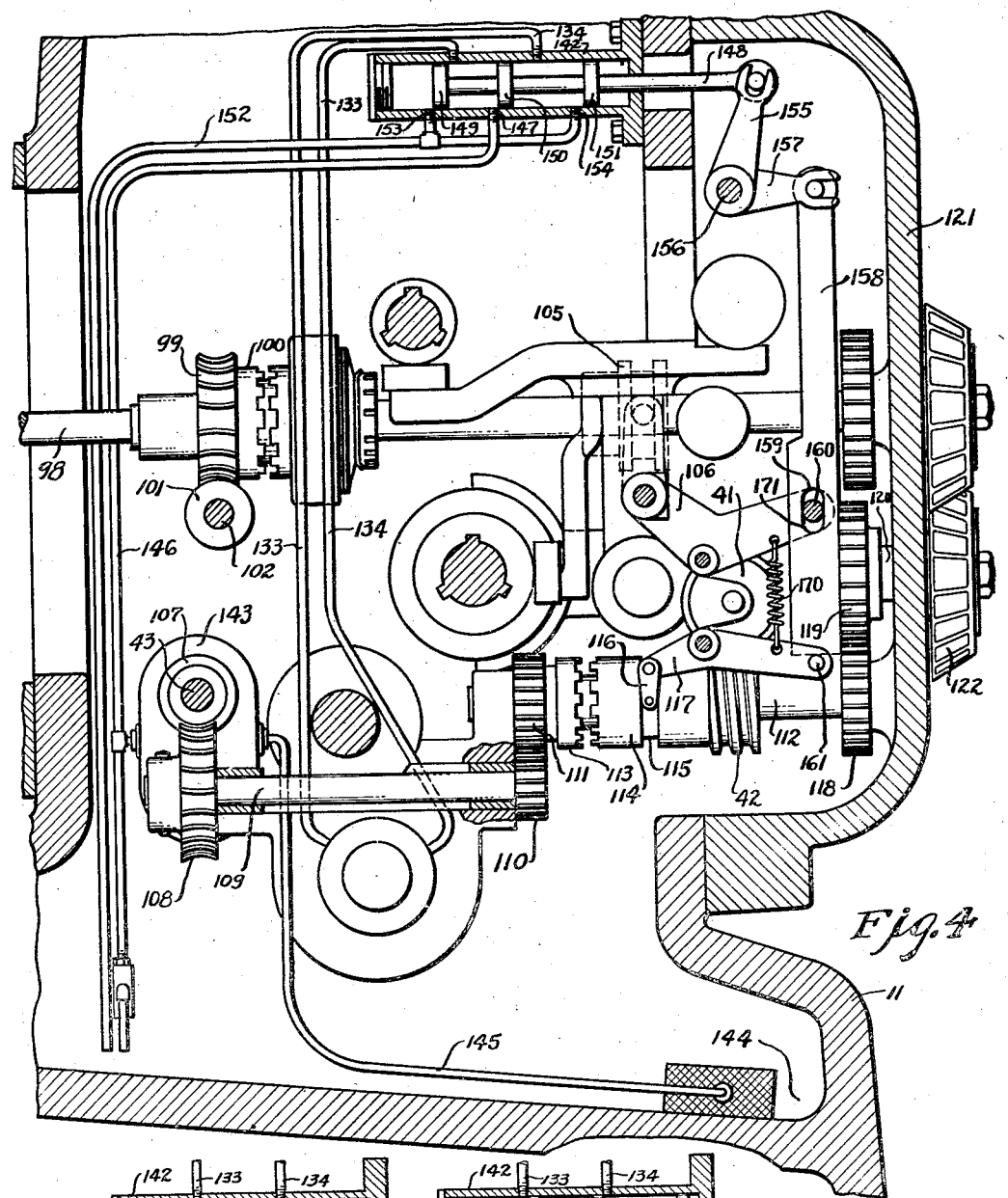
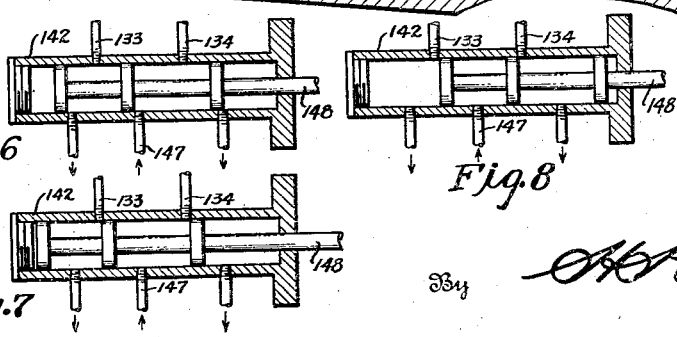
Fig.4
Fig.6  Fig.8
Fig.7
Inventor
MILLARD ROMAINE
WALTER D. ARCHEA
By A.K.Parsons
Attorney

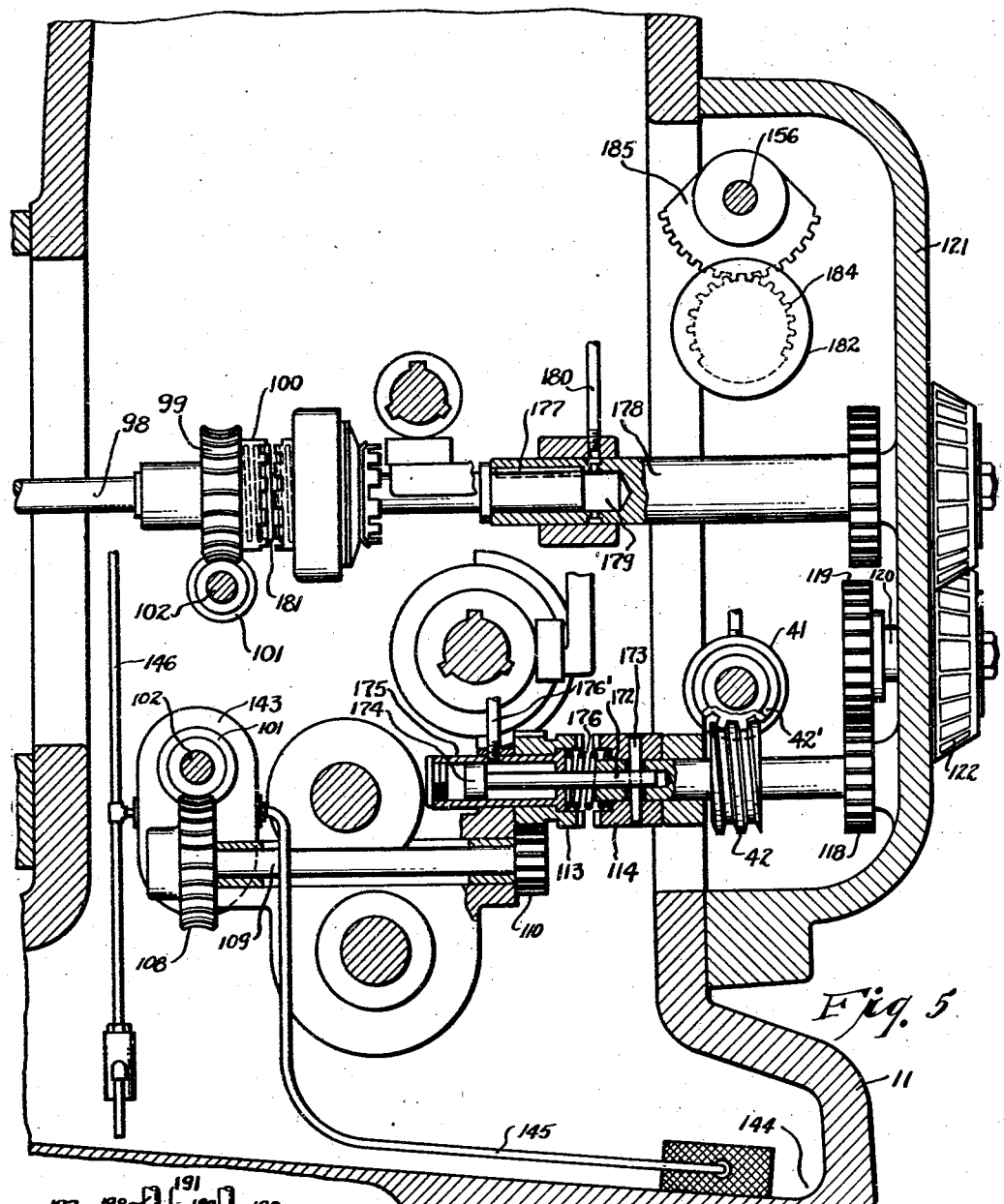

1,914,167

UNITED STATES PATENT OFFICE

MILLARD ROMAINE AND WALTER D. ARCHEA, OF CINCINNATI, OHIO, ASSIGNORS TO THE CINCINNATI MILLING MACHINE COMPANY, OF CINCINNATI, OHIO, A CORPORATION OF OHIO

MILLING MACHINE

Application filed July 29, 1932. Serial No. 625,802.

This invention relates to machine tools and more particularly to improved control means therefor.

One of the principal objects of this invention is to simplify the control of machine tools and more especially to reduce the number of levers for controlling the main functions of the machine.

Another object of this invention is to provide a single control element for the more frequently operated parts of a milling machine which may be operated from a plurality of stations.

A further object of this invention is to provide an improved control system for a milling machine whereby the starting and stopping of the spindle and the rate of the spindle actuating mechanism may be easily and quickly determined by a single control member.

Other objects and advantages of the present invention should be readily apparent by reference to the following specification considered in conjunction with the accompanying drawings illustrative of one embodiment thereof, but it will be understood that any modifications may be made in the specific structural details thereof within the scope of the appended claims, without departing from or exceeding the spirit of the invention.

Referring to the drawings in which like reference characters indicate like or similar parts:

Figure 1 is an elevation of a milling machine embodying the principles of this invention.

Figure 2 is a diagram of a monolever hydraulic control mechanism.

Figure 3 is an expanded view of a variable speed spindle transmission having an hydraulically actuated starting clutch.

Figure 4 is a sectional view showing one form of connections between the mono-control element and the various parts operable thereby.

Figure 5 is a sectional view similar to Figure 4 illustrating a modified form of the invention.

Figures 6, 7 and 8 show the various positions of the clutch control valve illustrated in Figure 4.

Figure 9 is a sectional view of the control valve shown in Figure 5.

Figure 10 is an expanded view of a variable feed transmission for the work support.

Figure 11 is an expanded view of a power operable feed change mechanism associated with the feed transmission.

Figure 12 is a schematic diagram showing the final drive to a table, saddle and knee of a work support organization.

Figure 13 is a detail section on the line 13—13 of Figure 1.

Figure 14 is a detail view showing the various positions of a mono-control lever.

This invention contemplates the provision of improved control mechanism for a milling machine and is illustrated in connection with a knee and column type machine although equally adaptable to other types of milling machines having a power actuated spindle and work support. In such machines the cutter spindle 10 is generally supported or carried by a column member 11 and usually arranged to be driven at various speeds. For this purpose a variable speed transmission is provided, one form of which is illustrated in Figure 3, having a primary shaft 12 adapted to be connected to a prime mover 13 by means of a starting and stopping clutch 14.

The transmission comprises gear couplets 15 and 16 slidably splined on the shaft 12 for effecting actuation of a shaft 17 at any one of four different speeds. The couplet 15 comprises gears 18 and 19 shiftable respectively into mesh with gears 20 and 21 and the couplet 16 comprises gears 22 and 23 shiftable respectively into mesh with gears 24 and 25. A third splined shaft 26 parallel to shaft 17 carries a shiftable couplet comprising gears 27 and 28 shiftable respectively into mesh with gears 24 and 29 fixed to shaft 17 for effecting actuation of shaft 26 at eight different speeds. A backgear shaft 30 has a gear 31 fixed thereto which is adapted to be driven in opposite directions from shaft 26 through a reversing mechanism 32.

The reversing mechanism comprises a pair of equally sized gears 33 and 33' which are mounted on a shaft 34 intermediate the shafts 26 and 30, the gear 33' being in constant mesh with the gear 31. The shaft 26 is provided with a shiftable gear 35 which when meshing with gear 33 effects rotation of gear 31 and shaft 30 in one direction. Upon movement to the right of the position shown, the gear 35 will mesh directly with the gear 31 to effect rotation thereof in the opposite direction. A back gear couplet 36 is splined on the shaft 30 and comprises gears 37 and 38 shiftable respectively into mesh with gears 39 and 40, the latter pair of gears being fixed to the spindle 10. From the foregoing it should now be apparent that one form of variable speed transmission has been provided having shiftable couplets which may be variously arranged to provide for operation of the cutter spindle at any one of sixteen speeds.

The shifting of these change speed elements of the spindle transmission may be effected by any known type of power shifting mechanism, that shown in copending application of Nenninger and Ernest, Serial Number 458,852 filed May 31, 1930 being suitable for present purposes. As there shown, the shifting of the various elements is controlled by a selector valve denoted herein by reference numeral 41 and which is adapted to be driven through intermeshing spiral gears 42 and 42'.

It is usual practice to provide for relative movement between cutter and work in a plurality of directions, and for this purpose milling machines are usually provided with a variable feed transmission. Such transmission may be of any known type and a conventional type is illustrated herein. A shaft 43 is journaled in the column for actuation by the prime mover 13 through a gear train comprising a gear 44, Figure 3, a gear couplet 45 and a final gear 46 in the order named, the gear 46 being integral with the shaft 43. A gear 47, Figure 10, keyed to the shaft 43 meshes with a gear 48 keyed to a spline shaft 49 which has mounted thereon the shiftable gear couplets 50 and 51 which together with a shiftable gear couplet 52 on the shaft 53 are adapted to engage selectively the gear couplets 54, 55 and gear 56 fixed to the intermediate parallel shaft 57 for transmitting any one of eight different speeds from the shaft 43 to the shaft 53. An additional shaft 58 parallel to the shaft 53 is provided with a shiftable gear couplet 59 for engaging either of the gears 60 or 61 fixed to the shaft 53 for transmitting any one of 16 speeds to the final driver 62 through the gear 63 fixed to the shaft 58. The final gear 62 of the variable feed transmission is mounted for free rotation on the shaft 64 and a clutch member 65 is provided for selective engagement therewith to effect rotation of a bevel gear 66 keyed to the end of shaft 64.

In addition, a rapid traverse transmission may be provided in parallel relation to the feed transmission and may comprise a gear 67 keyed to the shaft 43 in mesh with gear 68 of the couplet 69 mounted for free rotation on the end of shaft 49, the other gear 70 of the couplet meshing with an intermediate gear 71 which in turn drives a final gear 72 also mounted for free rotation on the shaft 64. This gear is adapted to be coupled to the shaft 64 by means of the clutch member 65 which in effect becomes a feed-rapid-traverse determinator.

The shaft 64 is adapted through the bevel gear 66 to drive a bevel gear 73 keyed to the upper end of shaft 74, Figure 12, which is vertically journaled at the side of the column and inclosed by tubes 75 for actuating the branch transmissions to the knee, saddle and table. A gear 76 journaled in the knee for movement up and down therewith is splined on the shaft 74. This gear through gear train indicated generally by reference numeral 76' actuates the spline shaft 77 having slidably mounted thereon the bevel gear 78 for driving the reverser mechanism 79 through the bevel gear 80. The reverser mechanism is adapted to actuate the table feed screw 81' for effecting reciprocation of the work table 80. The gear 76 also actuates through inter-connected gearing the reverser 82' for selectively controlling the movement of the saddle 82 in either direction of movement and the reverser 83' selectively controlling the vertical movement of the knee 83. It is thus seen that the work support may be translated from the shaft 74 at either a feed or rapid traverse rate in any one of three directions and that the feed rate may be varied to determine the relative movement between cutter and work.

In order to determine the feed rate of the various movable elements of the work supporting organization, a power actuated feed change mechanism is provided in conjunction with the variable feed transmission. This mechanism may comprise a cam shaft 84 journaled in the column parallel to the main transmission shaft and having mounted thereon cam drums 85 and 86, Figure 11, for effecting through the shifter arms 87 and 88 shifting movements of the gear couplets 50 and 51 respectively in a predetermined sequence to effect progressive changes of feed rates in the transmission. Another shaft 89 is journaled adjacent to shaft 84 for supporting cam drums 90 and 91 for shifting the gear couplets 52 and 59 respectively through the shifter arms 92 and 93. These shifting movements are also made in predetermined sequence to effect progressive changes in the feed rate of the transmission. The shafts 84 and 89 are inter-connected by spur gears 94 and 95 for joint rotation. Power operation of these shafts is effected by means of the bevel gear 96 fixed to the end of shaft 89 meshing with bevel gear 97 keyed to shaft 98 journaled in a fixed part of the column which is adapted to be rotated by the helical gear 99, Figures 4 and 5, through the clutch 100. The helical gear 99 is mounted for free rotation on the shaft 98 but fixed against axial movement with respect thereto. Power is supplied by an intermeshing helical pinion 101 keyed to the stub shaft 102 which in turn is driven through inter-connected gears 103 and 104, Figure 10, from the main drive shaft 49. The clutch 100 is fixed with the shaft 98 and has a spool 105 engaged by bell crank 106 for reciprocating the shaft to effect engagement and disengagement of the clutch.

The worm 42 for effecting rotation of the selector valve 41 is power rotated from the prime mover through the following mechanism. A worm gear 107, Figures 4 and 5, on the shaft 43 meshes with a worm gear 108 keyed to one end of shaft 109 which has a pinion 110 keyed to the opposite end in mesh with a gear 111 mounted for free rotation on the shaft 112. A clutch member 113 is formed integral with the gear 111 and adapted to be engaged by the shiftable clutch member 114 having a spool 115 engaged by the shifter fork 116 fixed to the end of the pivoted bell crank 117. The clutch member 114 is splined on the shaft 112 and adapted to be axially moved to engage and disengage the clutch 113 and thereby determine rotation of the worm gear 42 which in turn rotates the selector valve to determine the speed of the spindle transmission. A pinion 118 keyed to the end of shaft 112 meshes with a gear 119 keyed to the end of a rotatable shaft 120 which projects through the side of the bracket 121 where it is provided with an indicating dial 122 whereby the operator will be informed at all times of the setting of the change speed mechanism and thereby the rate at which the spindle is rotated.

The most important functions in the operation of a milling machine and those which are constantly being utilized by the operator are the starting and stopping of the spindle as at the beginning and end of each cut; the determination of the rate of rotation of the spindle and the rate of relative feeding movement between the work and cutter. One of the important features of this invention is to consolidate the controls for these various functions in a single member which is easily moved and in which the operative movements are logically arranged so as to prevent confusion in the mind of the operator and in which certain interlocking arrangements are provided thereby insuring proper control even in the hands of an inexperienced operator.

To facilitate operation of this control member, power means have been utilized to effect actual operation of the spindle starting clutch, the power means being put under the direction of this single control member. This clutch is more particularly illustrated in Figure 3 and it is of the friction disk type comprising an outer spider member 123 integral with the constantly driven gear 44 and an inner member 124 splined to the shaft 12. A series of friction disks 125 are operatively connected to the spider 123 and are interposed between a plurality of similar members 126 splined to the periphery of a fixed sleeve 124 splined on shaft 12. A pressure member 127 is operatively connected to a sliding cylinder 128 for rotation and axial movement therewith.

The sleeve 124 has an annular flange 129 which acts as a fixed piston for the cylinder 128. A sleeve 130 is fixed against rotation in the column and provided with internal annular grooves 131 and 132 to which are connected the pipes 133 and 134. An axial channel 135 formed in the sleeve 124 serves to connect the annular groove 131 with chamber 136 formed in one end of the cylinder, and a second axial channel 138 serves to connect the annular groove 132 to the chamber 139 formed in the opposite end of the cylinder. It should thus be apparent that admission of pressure to channel 134 will cause cylinder member 128 to move forward and exert pressure on the friction plates causing rotation of the shaft 12; and admission of pressure to channel 133 will effect withdrawal of the cylinder member and thereby the disengagement of the clutch. The rear end of the cylinder member 128 is provided with an annular bevel surface 140 adapted to engage the cone surface 141 on the fixed sleeve 130 so that upon the admission of pressure to chamber 136 to disengage the clutch these surfaces will be brought into engagement to act as a brake to accelerate the stopping of the spindle.

The channels 133 and 134 may be connected to a suitable control valve such as 142, Figures 4, 6, 7 and 8, which in turn is supplied with fluid pressure from a pump 143, the pump being driven from an extension of shaft 43 as shown in Figure 10. This pump may draw fluid from a suitable reservoir 144, Figure 5, formed in the machine through pipe 145 and deliver the same under pressure through channel 146 to the pressure port 147 of the valve. The valve plunger 148 is provided with a plurality of spools 149, 150 and 151 for connecting the pressure port with channels 133 and 134. A return line 152 having ports 153 and 154 in the valve housing extends to the reservoir 144 for returning the exhausted fluid from the clutch operating cylinder thereto. When the valve plunger is in the position shown in Figure 4, port 147 is connected to channel 133 to effect disengagement of the clutch and at the same time the channel 134 is connected to the exhaust port 154. Movement of the valve plunger to the left will reverse these connections, the pressure port 147 then being connected to channel 134 to effect engagement of the clutch, while the channel 134 will be connected to reservoir through port 153 as shown in Figure 6.

A bell crank 155 is pivotally connected to a rotatable shaft 156 which is journaled at opposite ends in the bracket 121. The other arm 157 of the bell crank is connected to the link 158 which has a lost motion connection at 159 with a pin 160 integrally secured in the end of bell crank 106, while the lower end of the link is adapted to operatively engage a pin 161 fixed in the end of the bell crank 117. The shaft 156 is provided at one end with a manual operating handle 162, Figure 1, whereby the parts may be controlled from a position at the rear of the machine. The shaft 156 has pinion teeth 163 on the end whereby it may be connected to a vertically reciprocable member 165 by a connection similar to one shown in Figure 13 by which the member 165 is connected to shaft 167. The member 165 is supported from the bracket 121 and depends adjacent to and parallel with the knee so that it may be passed through a bracket 166 carried by the knee for supporting the operating shaft 167. This shaft has pinion teeth 163′ meshing with teeth on the reciprocable rack member 164 meshing with a pinion 164′ slidably splined on shaft 165. The reciprocable member 165 has operating handles 168 and 169 secured to opposite ends thereof. It will be noted that the handle 168 is located at the front part of the machine and that the handle 169 is located at the side of the column near the rear of the table whereby the operator may observe the action of the cutter from either side thereof while mantaining absolute control over the movements of the various parts.

The single control lever 168 for instance may be utilized to control the starting and stopping of the spindle, the determination of the rate of rotation of the spindle and the determination of the feed rate at which relative translation between cutter and work will occur, in the following manner. The lever has a neutral position, as shown in full lines in Figure 14, which corresponds to the position of the parts as shown in Figure 4 in which the spindle starting clutch is disengaged, the brake is applied, and the rate change clutches 113 and 100 disconnected.

It is preferred practice in the operation of milling machines to prevent actuation of the speed change mechanism for the spindle during rotation thereof. It is therefore desirable in arranging the control for the spindle clutch and the speed change mechanism for operation by a single control member to insure that the speed change mechanism cannot be operated while the spindle is rotating. To this end a spring 170, Figure 4, is connected at opposite ends to the bell cranks 117 and 106 to urge the same toward a fixed stop and normally mantain the links 158 in a neutral position in which the pin 160 will be centrally located with respect to an elongated slot 171 formed in the link.

With the parts in the position shown in Figure 4 the valve plunger 148 is in a position connecting the pressure line 147 to channel 133 thereby disconnecting the starting clutch and applying the brake, and the bell cranks 106 and 117 are urged to a position such that the clutches 100 and 114 controlled thereby are disconnected. From this it will be seen that when the spindle is not rotating, the speed and feed rate change mechanisms are not being actuated. Movement of the lever 168 counterclockwise from its neutral position will effect downward movement of the link 158 and thereby engagement of clutch 114 which will cause rotation of the selector valve to change the speed of the spindle transmission and it will be noted without effecting rotation of the spindle, or the possibility of the operator inadvertently changing the speed rate of the spindle during rotation thereof. The valve plunger 148 will assume the position shown in Figure 8, the only effect of which is to disconnect pressure from the brake. Clockwise movement of the lever 168 from its neutral position will first effect longitudinal movement of the valve plunger 148 to the position shown in Figure 6, thereby connecting the pressure port 147 to the line 134 which in turn will start spindle rotation and simultaneously take up the lost motion between the slot 171 and the pin 160 fixed in the bell crank 106.

Further clockwise movement of lever 168 to its last position will effect rotation of the bell crank 106 thereby engaging clutch 100 to effect operation of the feed change mechanism and thereby change the relative rate of feed between the work and cutter. The spools on the valve plunger 148 which are now in the position shown in Figure 7 are so spaced that this additional movement will not disconnect the pressure from channel 134 thereby maintaining rotation of the cutter during the change in feed rate of the work.

It will thus be apparent that a single control lever has been provided for controlling the major functions of the machine, the lever having a neutral position and operating positions on either side thereof, the operating positions being so arranged that movement to one side of the neutral position will effect a rate change in the spindle transmission, while movement to the other side will effect rotation thereof thereby providing an interlocking feature whereby the speed of the spindle cannot be changed during rotation thereof. An additional position has been provided beyond the clutch operating position, whereby the feed rate may be changed during rotation of the spindle.

An alternative form of the invention is shown in Figures 2, 5 and 9 which may be utilized where more sensitive or finger tip control is desired. In this form of the invention the speed and feed rate control clutches are also hydraulically operated. As shown in Figure 5 the clutch 114 is operatively connected with a piston rod 172 by means of a pin 173, the piston rod having a piston 174 integrally formed on the end thereof and slidably mounted in an operating cylinder 175. A spring 176 may be interposed between members 113 and 114 to normally maintain the parts in a disengaged position. A pressure conducting pipe 176' is operatively connected to one end of the cylinder whereby admission of pressure will effect engagement of the clutch against the resistance of spring 176 and upon the release of pressure the spring will come into action to effect disengagement.

The shaft 98 extends into the bore 179 in the end of shaft 178 and operatively connected thereto as by a key 177. The bore 179 acts as a cylinder and the end of shaft 98 as a piston so that admission of pressure to the bore will effect longitudinal movement of shaft 98 and thus engagement of the clutch 100. A pressure pipe 180 therefore is connected to the bore for delivering pressure thereto, and a spring 181 is interposed between the opposed members of the clutch for effecting disengagement thereof upon the relief of pressure in channel 180.

As shown in Figure 2, the channels 133, 134, 176 and 180 are connected to a common control valve 182 having a rotatable valve plunger 183 which has keyed thereto an operating gear 184 as shown in Figure 9. This gear is operatively connected to a gear segment 185, Figure 5, keyed to the rotatable shaft 156 for control by the handles 168 and 169 in the manner previously explained. As shown in Figure 2, the pump pressure line 146 is connected to port 186 which communicates with an annular groove 187 formed on the periphery of the valve plunger 183. A chordal channel 188 couples the annular groove to a longitudinal bore 189 intersecting chordal channels 190 and 191 which terminate in ports 192 and 193. An additional longitudinal bore 194 is formed in the member 183 and has radiating therefrom channels 195 and 196. Channel 195 communicates with annular groove 197 to which is connected the return channel 198. When the valve is in a neutral position the pressure from port 186 will flow through channels 188, 189, 190, port 192 to pipe 133 which will effect disconnection of the spindle clutch and engagement of the spindle brake. The pipe 134 from the opposite end of the clutch operating cylinder will be connected through operating channels 196, 194 and 195 to the return line 198 thereby permitting operation of the brake. Clockwise rotation of the valve from the position shown in Figure 2 will first connect pressure channel 190 to the port 199 of line 134 and simultaneously connect line 133 through its branch 133' to channel 196 leading to reservoir. It will be noted that in these two positions of the valve that the channels 176 and 180 were disconnected from pressure.

Further movement of the valve in a clockwise direction will couple the pressure channel 190 to the port 200 of pipe 180 thereby effecting engagement of the feed change operating clutch 100. In order to maintain pressure on starting clutch, a check valve 202 is inserted between channels 180 and 134 to permit fluid to flow from the former to the latter but prevent return flow.

Rotation of the valve counter-clockwise from its neutral position will couple the pressure channel 190 to port 201 of channel 176 thereby permitting operation of the speed change mechanism during non-rotation of the spindle.

From the foregoing it should now be apparent that the control levers 168 and 169 will have the same operating positions irrespective of the type of control mechanism utilized and that the valve member 182 may be rotated to any one of four different positions to effect power operation of the various clutches which determine the rate of rotation of the spindle as well as the rate of relative movement between the work and cutter.

There has thus been provided power actuable mechanisms for controlling the movement of these parts which are united under one control valve for operation by dual control levers and thus available at a plurality of operating positions at the machine.

What is claimed is:

1. In a milling machine having a rotatable cutter and a work support, mechanism for effecting relative bodily movement between the cutter and work carried by the work support, rotating mechanism for the cutter, rate changers for each of said mechanisms, a prime mover, means to connect and disconnect the rotating mechanism to and from the prime mover, means to retard rotation of the cutter, means to couple selectively the rate changers to the prime mover for power actuation thereby and a single control lever for effecting actuation of all of said means.

2. In a milling machine having a rotatable cutter and a work support, mechanism for effecting relative bodily movement between the cutter and work carried by the work support, rotating mechanism for the cutter, rate changers for each of said mechanisms, a prime mover, a first clutch for connecting the rotating mechanism with the prime mover, additional clutches for respectively coupling the rate changers with the prime mover for actuation thereby and a single control lever movable to different positions for effecting actuation of all of said clutches.

3. A milling machine having a column, a cutter spindle journaled in the column, a work supporting organization mounted on the column including a work table, translating mechanism for effecting relative movement between the cutter and work table, mechanism for effecting rotation of the spindle, rate changers for each of said mechanisms carried by the column, a prime mover a first clutch for coupling the prime mover to the rotating mechanism, additional clutches for selectively coupling the rate changers to the prime mover for actuation thereby, and a single control lever carried by the work supporting organization for determining engagement and disengagement of all of said clutches.

4. A milling machine having a column, a cutter spindle journaled in the column, a work support mounted on the column for movement relative to the cutter, translating mechanism for effecting relative movement between the cutter and work support, mechanism for effecting rotation of the spindle, rate changers for each of said mechanisms, a prime mover, a first clutch for coupling the prime mover to the rotating mechanism, additional clutches for selectively coupling the rate changers to the prime mover for actuation thereby, and a single control lever carried by the column for effecting engagement and disengagement of said clutches.

5. A milling machine having a column, a cutter spindle journaled in the column, a work support mounted on the column for movement relative to the cutter, translating mechanism for effecting relative movement between the cutter and work support, rotating mechanism for effecting rotation of the spindle, rate changers carried by the column for each of said mechanisms, a prime mover, a first clutch for coupling the prime mover to the rotating mechanism, additional clutches for selectively coupling the rate changers to the prime mover for actuation thereby, and dual control levers, one carried by the work support and the other carried by the column for effecting operation of all of said clutches.

6. A milling machine having a rotatable cutter, a work support, translating mechanism for effecting relative movement between the cutter and work support, rotating mechanism for the cutter, rate changers for each of said mechanisms, a prime mover, means to connect the rotating mechanism with the prime mover, means to retard rotation of the cutter upon disconnection from its rotating mechanism, clutches for selectively coupling the rate changers to the prime mover for actuation thereby and a single control lever movable to a plurality of stations in a single plane for successively actuating all of said means.

7. A milling machine having a rotatable cutter and a work support, rotating mechanism for the cutter, a rate changer for said mechanism, a prime mover, a first clutch for coupling said rate change mechanism with the prime mover for actuation thereby, a second clutch for coupling the rotating mechanism to the prime mover, a translating mechanism for effecting relative movement between the cutter and work, a rate changer for said translating mechanism, a third clutch for coupling the last named rate changer to the prime mover for actuation thereby and a single control lever movable successively to a plurality of stations to effect operation of said clutches in the order named.

8. A milling machine having a rotatable cutter and a work support, rotating mechanism for the cutter, a rate changer for said mechanism, a prime mover, a first clutch for coupling said rate change mechanism with the prime mover for actuation thereby, a second clutch for coupling the rotating mechanism to the prime mover, a translating mechanism for effecting relative movement between the cutter and work, a rate changer for said translating mechanism, a third clutch for coupling the last named rate changer to the prime mover for actuation thereby and a single control lever movable successively to a plurality of stations to effect operation of said clutches, said stations being so arranged as to prevent simultaneous actuation of the rotating mechanism and its rate changer.

9. A milling machine having a rotatable spindle, a work support, translating mechanism for effecting relative movement between the cutter and work support, rotating mechanism for effecting rotation of the spindle, power actuable rate changers for each of said mechanisms, a prime mover, a power actuable clutch for connecting and disconnecting the rotating mechanism with the prime mover, power actuable means to retard rotation of the cutter upon disconnection of the rotating mechanism, power actuable clutches for selectively coupling the rate changers to the prime mover for actuation thereby, an auxiliary source of power and a lever movable in a single plane to couple successively the auxiliary source of power to the various power actuable devices.

10. A milling machine having a rotatable spindle, a work support, translating mechanism for effecting relative movement between the cutter and work support, rotating mechanism for effecting rotation of the spindle, power actuable rate changers for each of said mechanisms, a prime mover, a power actuable clutch for connecting and disconnecting the rotating mechanism to or from the prime mover, a power actuable brake for the rotating mechanism, power actuable clutches for selectively coupling the rate changers to the prime mover for actuation thereby, an auxiliary source of power, a manual operating lever movable in a single plane to couple successively said auxiliary power source to the various power actuable devices, and means to reduce the braking pressure during operation of the rate changer for the rotating mechanism.

11. A milling machine having a cutter spindle, a work support movable relative thereto in a plurality of directions, translating mechanism for effecting said relative movement, power actuated mechanism for effecting rotation of the cutter, rate changers for each of said mechanisms, a prime mover, a first clutch for coupling the prime mover to the rotating mechanism, a second and third clutch for coupling the respective rate changers to the prime mover for actuation thereby, a common control shaft for said clutches, and manually actuable means for rotating said shaft predetermined successive amounts to operate said clutches individually.

12. A milling machine having a cutter spindle, a work support movable relative thereto in a plurality of directions, translating mechanism for effecting said relative movement, power actuated mechanism for effecting rotation of the cutter, rate changers for each of said mechanisms, a prime mover, a first clutch for coupling the prime mover to the rotating mechanism, a second and third clutch for coupling the rate changers to the prime mover for actuation thereby, a common actuating shaft for said clutches, individual motion transmitting means coupling the shaft to said clutches, and manual means for effecting rotation of said shaft.

13. A milling machine having a cutter spindle, a work support movable relative thereto in a plurality of directions, translating mechanism for effecting said relative movement, power actuated mechanism for effecting rotation of the cutter, rate changers for each of said mechanisms, a prime mover, a first clutch for coupling the prime mover to the rotating mechanism, a second and third clutch for coupling the rate changers to the prime mover for actuation thereby, a common actuating shaft for said clutches, individual motion transmitting means coupling the shaft to said clutches, manual means for effecting rotation of said shaft, said means comprising an oscillatable link, and a plurality of bell cranks operatively coupled to the clutches for successive operation by said link upon oscillation thereof.

14. A milling machine having a cutter spindle, a work support movable relative thereto in a plurality of directions, translating mechanism for effecting said relative movement, power actuated mechanism for effecting rotation of the cutter, rate changers for each of said mechanisms, a prime mover, a first clutch for coupling the prime mover to the rotating mechanism, a second and third clutch for coupling the rate changers to the prime mover for actuation thereby, a common actuating shaft for said clutches, individual motion transmitting means coupling the shaft to said clutches, manual means for effecting rotation of said shaft, said means comprising a rotatable valve, operating pistons coupled to each clutch, individual channels connecting the pistons to said valve, a source of pressure connected to the valve, and manual means to couple the pressure to any of said power actuable devices.

15. A milling machine having a rotatable cutter, a work support movable relative to the cutter in a plurality of directions, translating mechanism for effecting said relative movement, mechanism for effecting rotation of the spindle, individual rate changers for each of said mechanisms, dials associated with each rate changer to indicate the effective rate thereof, a prime mover, a clutch for connecting the spindle rotating mechanism with the prime mover, means to retard rotation of the spindle upon disengagement of said clutch, additional clutches for selectively coupling the rate changers to the prime mover for actuation thereby, a piston and cylinder connected to each clutch, a source of hydraulic pressure, a common control valve for coupling the pressure to said cylinders and a single control lever carried by the support for selectively positioning said valve.

16. A milling machine having a column, a saddle, table and knee supported upon the column, a cutter spindle journaled in the column, a power source, a variable speed spindle transmission and a variable feed transmission for the work supporting members mounted in the column for actuation from the power source, a starting clutch for coupling the spindle transmission to the power source, separate power operated gear shifting means for each transmission to effect rate changes therein, individual clutches for coupling each of said shifting means with the power source, bell cranks for operating each of the clutches, a single actuator having lost motion connections with each of the bell cranks for separate operation thereof, hydraulic control mechanism for the starting clutch, means coupling the mechanism to the actuator for operation during non-operation of the bell cranks, and manual means mounted on the saddle for operating said actuator.

17. A milling machine comprising a column, a cutter spindle journaled in the column, a work support organization carried by the column including a knee vertically movable thereon, a saddle reciprocably mounted on the knee for movement toward and from the column, a table mounted for translation on the saddle, a source of power, a variable speed transmission extending to the spindle, a variable feed transmission connecting the source of power to the work support organization, an hydraulically actuated starting clutch for coupling the spindle transmission to the source of power, separate power operated gear shifting means for each transmission to effect rate changes therein, individual clutches for coupling each of the shifting means with the power source, operating means for each clutch, a control valve for determining the operative effect of the starting clutch, an operating link having lost motion connections with said clutch operating means, and a positive connection with the control valve for determining the position of all of said clutches, individual manual control levers mounted respectively on the saddle, knee and column, means operatively connecting each lever to said link whereby the various parts may be jointly controlled by a single lever from a plurality of operating stations.

18. A milling machine comprising a column, a cutter spindle journaled in the column, a prime mover, a variable speed spindle transmission, an hydraulically actuable clutch for coupling the prime mover to the transmission, a work support organization carried by the column including a knee reciprocably mounted thereon, a saddle mounted on the knee for movement toward and from the column, a table reciprocably mounted upon the saddle, a variable feed transmission for effecting relative movement between the members of the work support organization and the cutter spindle, separate power operated gear shifting means for each transmission to effect rate changes therein, hydraulically actuable clutches for coupling each of the shifting means to the prime mover, resilient means for disconnecting the clutches upon release of the hydraulic pressure, a starting clutch movable to one position to couple the spindle transmission to the prime mover and a second position to disconnect the prime mover therefrom and simultaneously brake the spindle transmission, hydraulically actuable means for moving the clutch to either position, a source of pressure, and a common control valve selectively positionable to effect operation of all of said clutches in a predetermined manner.

19. In a machine tool having a rotatable tool spindle and a work support movable transversely thereof, the combination of a prime mover, a variable speed spindle transmission, a variable feed transmission, separate power operated means for changing the rate of each transmission, an hydraulically actuated clutch for coupling the spindle transmission to the prime mover, additional hydraulically actuated clutches for coupling the rate changers to the prime mover, a source of pressure, a control valve, a pair of channels extending from the control valve to the spindle clutch, an additional channel extending to the feed rate determining clutch, a check valve interposed between the last named channel and one of the first named channels to maintain engagement of the clutch during variation of the feed rate and manual means for positioning said valve from a plurality of operating stations at the machine.

20. A mono-control mechanism for a milling machine having a rotatable cutter spindle, a work support movable relative thereto, a common prime mover therefor, separate mechanisms for determining the rate of movement of each part, individual clutches for coupling the separate mechanisms to the prime mover for actuation thereby, a starting clutch for coupling the spindle to the prime mover and a brake for the spindle, comprising hydraulic means for actuating each of said clutches and the brake, a common control valve therefor, a first channel extending to the starting clutch, a second channel extending to the brake, third and fourth channels extending to the rate determining clutches, a source of pressure, a single control lever for selectively positioning the valve to admit pressure to said channels to effect engagement of said parts, and means to render said parts inoperative upon disconnection of pressure therefrom.

In testimony whereof, we affix our signatures.

MILLARD ROMAINE.
WALTER D. ARCHEA.